E. V. VARCOE.
DRIVING GEAR FOR MOTOR VEHICLES.
APPLICATION FILED DEC. 27, 1910.
1,072,797.
Patented Sept. 9, 1913.
3 SHEETS—SHEET 1.
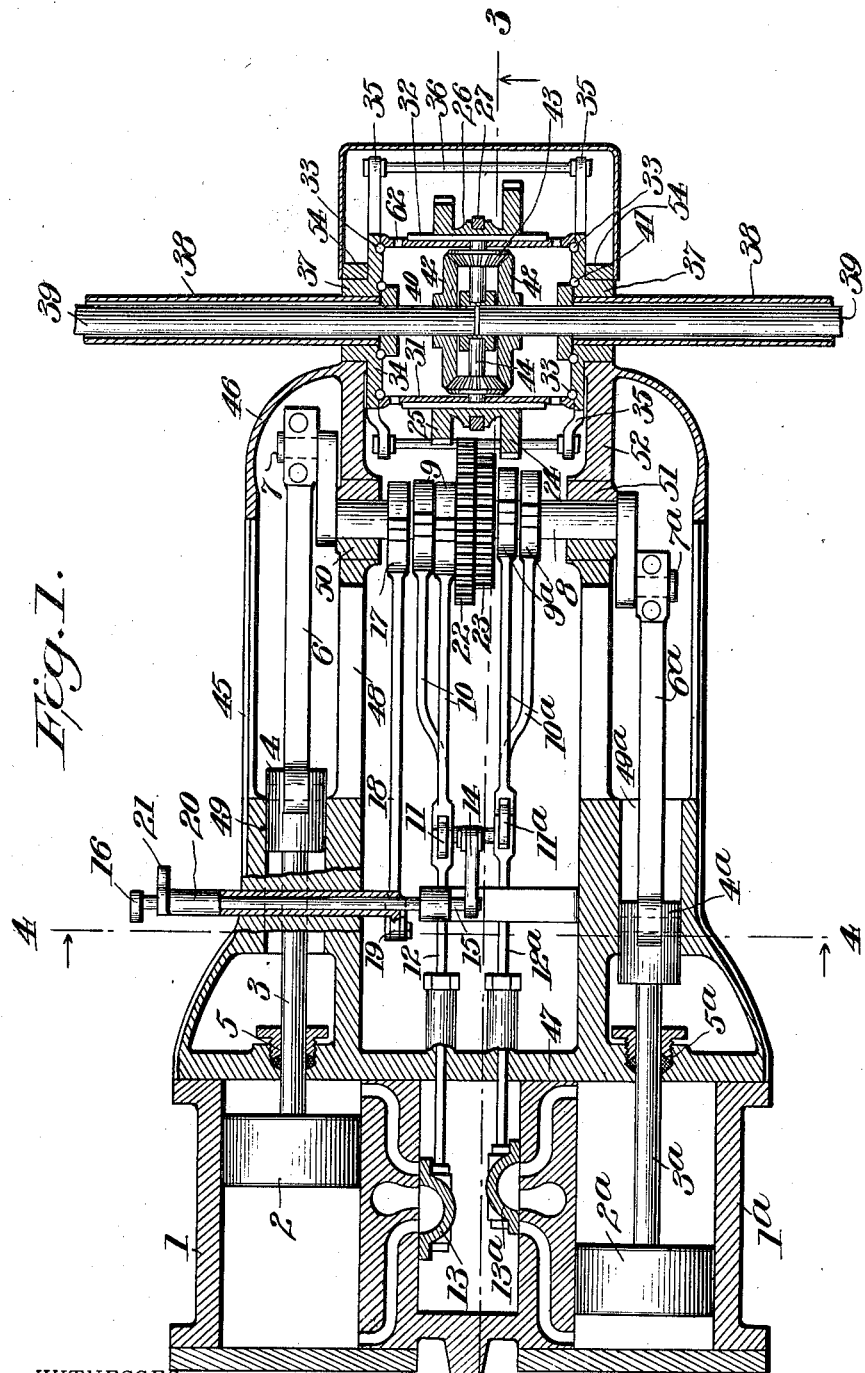
WITNESSES
C. N. Walker
Newton P. Willis.
INVENTOR
Earl V. Varcoe
Watson & Boyden
Attorneys E. V. VARCOE.
DRIVING GEAR FOR MOTOR VEHICLES.
APPLICATION FILED DEC. 27, 1910.
1,072,797.
Patented Sept. 9, 1913.
3 SHEETS—SHEET 2.
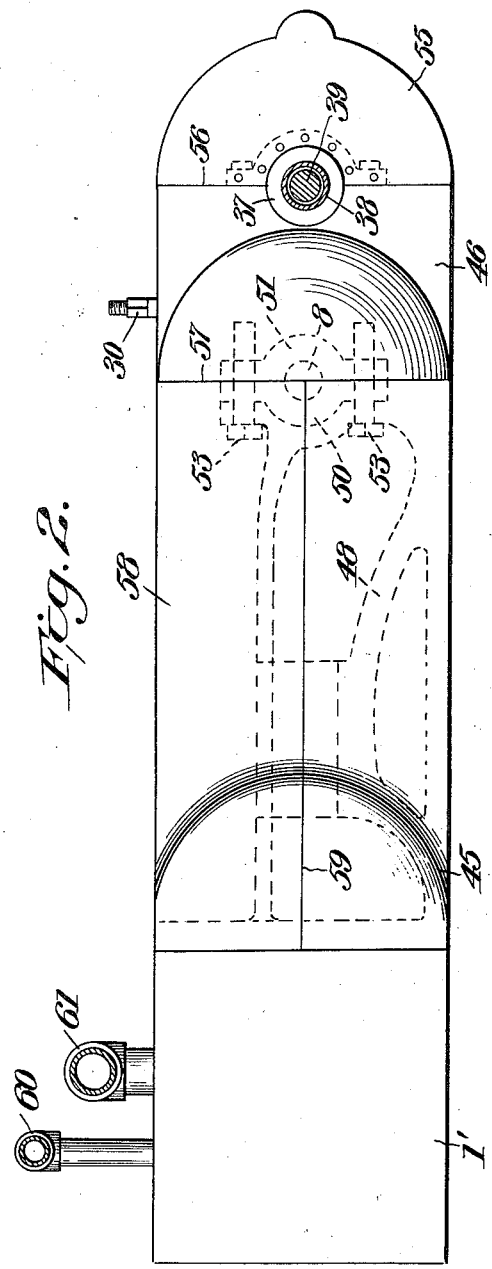
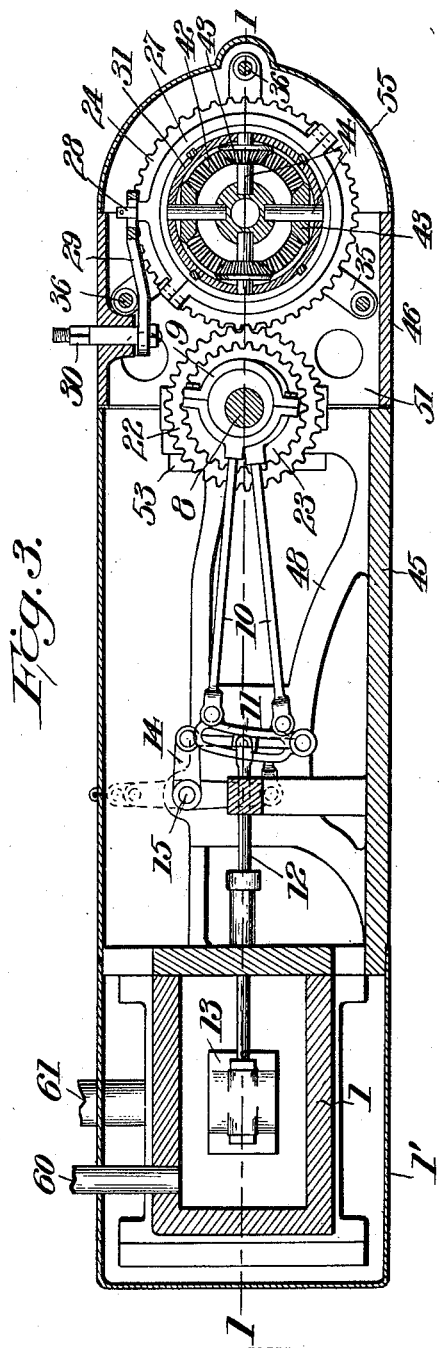
WITNESSES
INVENTOR
Earl V. Varcoe,
Watson & Boyden,
Attorneys E. V. VARCOE.
DRIVING GEAR FOR MOTOR VEHICLES.
APPLICATION FILED DEC. 27, 1910.
1,072,797.
Patented Sept. 9, 1913.
3 SHEETS—SHEET 3.
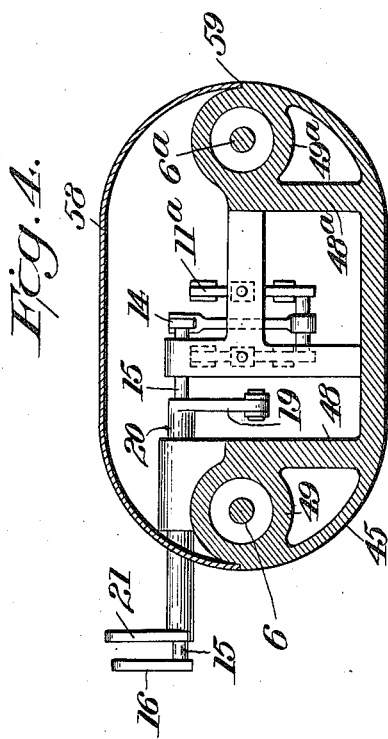
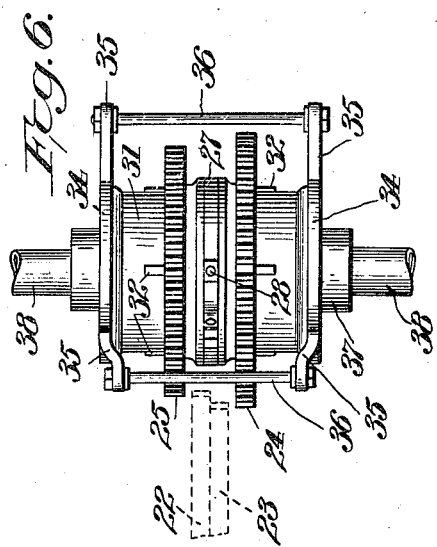
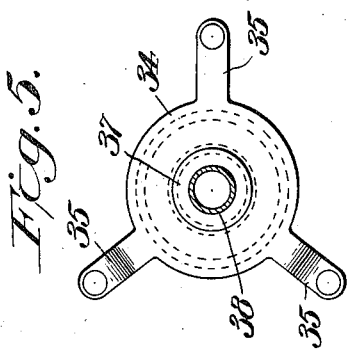
WITNESSES
C. N. Walker.
Newton P. Willis.
INVENTOR
Earl V. Varcoe
Watson & Boyden
Attorneys

UNITED STATES PATENT OFFICE.

EARL VERNON VARCOE, OF HONESDALE, PENNSYLVANIA.

DRIVING-GEAR FOR MOTOR-VEHICLES.

1,072,797.  Specification of Letters Patent.  Patented Sept. 9, 1913.

Application filed December 27, 1910. Serial No. 599,614.

*To all whom it may concern:*

Be it known that I, EARL V. VARCOE, a citizen of the United States, residing at Honesdale, in the county of Wayne and State of Pennsylvania, have invented certain new and useful Improvements in Driving-Gear for Motor-Vehicles, of which the following is a specification.

My invention relates to driving gear for motor vehicles, and more particularly to motor vehicles of the steam type, in which no clutch is employed in the transmission mechanism.

One object of the invention is to provide improved change speed mechanism for driving gear of this character, and a further object is to provide improved means for supporting the engine so as to insure the proper operation of such mechanism. To this end, the invention contemplates the mounting of gearing directly upon the differential drum, and the supporting of the engine in such manner that it may swing about the driving axle as a center.

With the above and other objects in view, as will appear later, the invention consists in the construction, arrangement, and combination of parts hereinafter described and claimed, and illustrated in the accompanying drawing, in which:—

Figure 1 is a sectional plan view of the complete engine and driving mechanism, the section being taken substantially on the line 1—1 of Fig. 3. Fig. 2 is a side elevation of the same. Fig. 3 is a longitudinal section substantially on the line 3—3 of Fig. 1, parts being shown in elevation; Fig. 4 is a transverse section substantially on the line 4—4 of Fig. 1, looking in the direction of the arrows; Fig. 5 is a detail hereinafter described, and Fig. 6 is a plan view of the differential drum and associated parts.

Referring to the drawings in detail, the engine which I preferably employ is of the horizontal type, and comprises the usual cylinders 1, 1$^a$, having pistons 2, 2$^a$, connected to piston rods 3, 3$^a$, secured at their other ends to cross heads 4, 4$^a$, and working through stuffing boxes 5, 5$^a$. Pitman rods 6, 6$^a$ are connected at one end to the cross heads, and at the opposite end to crank pins 7, 7$^a$, set into cranks secured ninety degrees apart to opposite ends of the engine shaft 8. Working on this shaft are two pairs of eccentrics 9, 9$^a$, connected by rods 10, 10$^a$, to valve gear links 11, 11$^a$, from which links extend valve rods 12, 12$^a$ to slide valves 13, 13$^a$. The links 11, 11$^a$ are shifted to control the point of cut-off by means of a lever 14, secured to one end of a shaft 15, to the other end of which is secured a crank arm 16, from which extends a suitable operating rod, (not shown). Also associated with the engine shaft 8 is an eccentric 17, connected by a rod 18 with a crank arm 19, secured to a sleeve 20 journaled in the engine frame, and provided at its outer end with a crank arm 21, to which may be attached a suitable connecting rod (not shown) for operating the pump.

All of the mechanism so far described may be of the well known or any suitable construction.

Rigidly secured to the engine shaft midway of its length is a plurality of change speed gear wheels or pinions, two of such wheels 22, 23, being shown by way of example in the drawings. Arranged to mesh with these pinions is a second pair of pinions 24, 25, rigidly united as by means of an annular web 26, and slidably mounted upon the outside of a cylindrical differential drum 31, one or more keys 32 being interposed to prevent relative angular movement. These gear wheels 24 and 25 are adapted to be shifted on the differential drum into and out of mesh with the corresponding wheels 22, 23, on the engine shaft, and to this end, I secure a split collar 27, loosely in a groove in the annular web 26, such collar being provided at the top with a pin or stud 28 about which engages a slot formed in the end of a crank arm 29 secured to a stud shaft 30, to which may be attached a suitable operating rod, (not shown), by means of which the shaft and crank arm may be rocked. It will thus be seen that, by this arrangement, in which one set of change speed gears is directly mounted upon the differential drum itself and the other set carried by the engine shaft, the construction is very much simplified, and all counter shafts, etc., eliminated. It will also be noted that the gears 22, 23 on the engine shaft are located at a point substantially opposite the middle of the differential drum, so that whichever of the gears 24 or 25 is in mesh, such active gear will be located at a point midway the length of the drum, whereby the driving strains will be equalized.

The differential drum 31 is rotatably supported at each end by means of ball bearings 33, upon a disk 34, such disk being provided with a plurality of radial arms 35, as clearly shown in Figs. 5 and 6, so as to constitute a spider, the extremities of such arms being rigidly united by tie rods 36. Each disk is provided with an outwardly projecting annular flange or hub 37, which is brazed or otherwise rigidly secured to a fixed sleeve 38 which surrounds the divided driving axle 39, as clearly shown in Fig. 1. To each section of the driving axle 39 is secured a collar 40, between which and the corresponding disk 34 are arranged ball bearings 41, such disks thereby serving as bearings both for the live axle and the differential drum. Also secured to each section of the axle 39 is a beveled gear 42, such gears coöperating with a plurality of idle beveled pinions 43 mounted on stud shafts 44, supported by the differential drum and radially arranged around the axle in a well known manner.

The driving mechanism above described, as well as the valve gear and associated parts of the engine, is all inclosed in a dust and oil proof casing. Such casing comprises main and auxiliary sections designated in their entirety by reference characters 45, and 46, respectively. As clearly shown in Fig. 1, it will be seen that the main section 45 is preferably formed integral with a wall 47 which constitutes the heads of the cylinders and valve chest. The section however may be bolted to the cylinder heads without departing from the spirit of the invention.

Preferably formed integral with the casing 45 are longitudinally extending frames 48, 48ᵃ which have portions 49, 49ᵃ, forming guides for the cross heads 4, 4ᵃ. Also formed integral with the frames 48 are one half of the bearing bosses 50, forming the journal boxes for the engine shaft 8. The other half 51 of the bearing bosses are carried by webs 52 formed integral with the auxiliary casing section 46, as may be seen by reference to Figs. 1 and 2. The halves of these bosses are held together by means of bolts 53 (see Fig. 2) which also serve to rigidly unite the main and auxiliary sections of the casing.

The auxiliary section 46 of the casing is itself journaled at each side of the differential drum upon the collars 37 of the spiders, half bearings being formed in the section itself, and the other half bearings being formed by means of straps 54, bolted to the casing (see Fig. 2). It will be observed that the auxiliary section 46 is a complete closed ring, preferably cast, and serves at its upper side to support the stud shaft 30. A semi-cylindrical shell, preferably formed of sheet metal, is secured to the outer end of the section 46 as clearly shown in the drawings, and serves to completely incase the differential drum and gearing, the joint 56 between the shell and auxiliary section, and the joint 57 between the main and auxiliary sections being preferably packed with felt or similar material so as to render the entire casing oil tight and dust proof.

As will be seen by reference to Fig. 4, the cast metal body 45 of the main section extends only approximately half way up, the upper part of the main casing being formed by a removable lid or cover 58, preferably formed of sheet metal, and seating in a groove 59 on the main casing. It will be noted that by removing this cover 58, the bolts 53 may be loosened and removed, and the main and auxiliary sections thus separated in order to afford access to the driving gear for inspection or repairs.

In practice, I preferably provide a sheet metal casing 1' around the cylinders and valve chest, as clearly shown in Figs. 2 and 3, in order to lessen condensation. The steam supply pipe 60 and exhaust 61 pass through this casing. In practice also, I propose to fill the entire casing with oil to such depth that the crank pins and gearing may dip therein, and thus constitute a splash system of lubrication, the differential drum being preferably provided with openings 62 (see Fig. 1) to permit the circulation of oil.

It will be noted that the entire engine and casing constitute one rigid frame, the casing entirely inclosing all operating parts and constituting the sole support for the engine shaft and valve gear, the entire frame being pivotally supported about the axle as a center, so as to insure the proper relation between the gears. At the end of the engine frame remote from the axle, I provide a lug 63, preferably spherical, to which any suitable form of hanger may be attached so as to support such end of the engine from the frame work of the vehicle.

In most steam motor vehicles, as heretofore constructed, it has been customary to permanently connect the engine shaft to the driving axle through gearing having a fixed speed ratio. In such an arrangement, variations in speed can only be produced by regulating the rapidity with which steam is developed in the boiler, or by manipulation of a throttle valve. As is well known, however, throttling an engine results in a loss of efficiency, as does also the running of the engine under heavy loads at low speeds. Under such conditions the steam is not used expansively. By the use of my improved change speed gearing, I am enabled to operate the engine at normal speed when hill climbing, and thereby gain a great deal in efficiency. Moreover, by providing a low speed transmission, I am enabled to use a much smaller boiler and to reduce the time required for steaming up. My change speed gears also permit the engine to run free at times, thereby enabling the water to be cleared out of the cylinders or the pipes prevented from freezing in cold weather, when the vehicle is standing still.

It will thus be seen that I have provided an exceedingly simple, compact and strong driving gear for steam vehicles, and it is thought that the many advantages of my invention will be readily appreciated by those skilled in such matters.

I desire to have it understood that where the word "axle" occurs in the claims, the combination described is not limited to use in connection with an actual supporting axle, but may also be employed in connection with a divided jackshaft, or the like. It will also be understood that I may, of course, employ plain bearings in place of the ball bearing shown and described.

What I claim is:—

1. In a motor vehicle, the combination with the usual divided axle, of a sleeve inclosing the same, a disk secured to said sleeve at each side of the point of division of said axle, a cylindrical, differential drum extending between and rotatably supported by said disks, change speed gears mounted on said drum, a driving shaft, and corresponding gears carried by said driving shaft and adapted to mesh with said first mentioned gears.

2. In a motor vehicle, the combination with the driving axle, a differential drum arranged concentric therewith, an engine shaft parallel with the axis of said drum, a set of change speed gears secured to said engine shaft at a point opposite the middle of said differential drum, and a corresponding set of gears slidably mounted on said drum and movable into and out of mesh with said first mentioned set, the arrangement being such that the active gear of said second set is always located at a point substantially midway the length of the drum, whereby the driving strains are equalized.

3. In a motor vehicle, the combination with the driving axle, of a differential drum associated therewith a gear wheel carried by said drum, an engine shaft, a second gear wheel carried by said engine shaft and adapted to mesh with the first mentioned wheel, engine cylinders and a closed casing rigidly secured to said cylinders and extending therefrom to and around the axle adjacent said differential drum, and a frame formed integral with such casing and constituting the sole support for the engine shaft and associated parts.

4. In a motor vehicle, the combination with the driving axle, of a fixed sleeve inclosing the same, a differential drum rotatably supported by said sleeve, a gear wheel carried by said drum, an engine having a shaft, a second gear wheel carried by said engine shaft, and adapted to mesh with said first mentioned gear, a casing wholly inclosing said gearing and forming the sole support for the engine shaft, said casing comprising main and auxiliary sections united on a line passing through the engine shaft, said main section being rigid with the cylinder heads of the engine, and said auxiliary section being rotatably supported by said fixed sleeve, whereby said engine and casing may swing about said sleeve as a center.

5. In a motor vehicle, the combination with the usual divided axle, of a differential drum mounted thereon, a set of change speed gears mounted on said drum, an engine comprising a pair of cylinders spaced apart, pistons in said cylinders, an engine shaft disposed parallel with said divided axle, a pair of spaced bearings in which said shaft is journaled, a crank carried by each end of said shaft outside of said bearings, and connected with one of said pistons, said axle, shaft, and cylinders all lying in substantially the same horizontal plane, a second set of change speed gears mounted on said shaft, means for shifting the gears of one of said sets into and out of mesh with the gears of the other, the two active gears always lying in a vertical plane passing substantially midway between the engine cylinders and between the said pair of bearings, whereby the driving strains are equalized.

In testimony whereof I affix my signature, in presence of two witnesses.

EARL VERNON VARCOE.

Witnesses:
 EMERSON W. GAMMELL,
 M. LEE BRANMANN.